Patented Mar. 13, 1928.

1,662,421

UNITED STATES PATENT OFFICE.

PAUL HEROLD AND PAUL KOPPE, OF NEUROSSEN, GERMANY, ASSIGNORS TO GRASSELLI DYESTUFF CORPORATION, OF NEW YORK, N. Y., A CORPORATION OF DELAWARE.

PRODUCTION OF PRIMARY AMINES.

No Drawing. Application filed August 20, 1927, Serial No. 214,444, and in Germany August 21, 1926.

It is already known that aromatic nitro-compounds can be converted into the corresponding amines by reduction with solutions of alkali metal sulphids or ammonium sulphids, the sulphids undergoing oxidation into thiosulphates and free sulfur or polysulphids.

We have now found that aromatic nitro-compounds may be advantageously reduced to amines by means of solutions containing readily soluble sulphids in amounts insufficient for the reduction if the reaction be carried out, under pressure and at an elevated temperature in the presence of hydrogen or carbon monoxid, or mixtures of both. In this case, even small amounts of sulphid solutions are sufficient to effect complete conversion, inasmuch as the polysulphid or thiosulphate formed is continuously again reduced to sulphid by the reducing gases, and this sulphid is therefore able to convert any desired quantity of the nitro-compounds into amines. The sulphid solution need not be added as such, all that is necessary being to employ the solution of the base in admixture with elementary sulfur. Solutions of polysulphids and thiosulphates may also be used.

It has been found that in this reaction the whole of the thiosulphate is not continuously reduced to sulphid by the hydrogen, but that a small portion of the resulting thiosulphate is decomposed, with the formation of sulphate and sulphid, at the elevated temperature of the process. Of that portion of the thiosulphate which is decomposed in this manner, only half, namely the sulphate is thereby lost to the reduction process, and none of the simultaneously formed sulphid. Under the conditions of working according to this process the sulphate cannot be reduced by the hydrogen, whereas, on the other hand, the sulphid continues to take part in the reaction.

The amount of sulphid, polysulphid or thiosulphate introduced with the nitro-compound into the process may be so chosen at the commencement, that when the reduction of the nitro-compound is completed practically the whole of the added sulphur is converted into sulphate, the reaction product therefore consisting entirely of amine and an alkali metal or ammonium sulphate solution, free from sulphid or thiosulphate. This result is obtained by employing, for the reduction of the nitro-compound, only a very small quantity of sulphid, the amount of which depends on the temperature at which the reduction is carried out, and is only 1/20th to 1/60th of the theoretical quantity, that is to say, the quantity required in the absense of hydrogen or other reducing gases.

The advantage of this method of working is that a very small quantity of sulphid suffices, and at the same time as for instance when ammonium sulphid is used—a valuable sulphate solution is obtained.

The hydrogen and carbon monoxid require no preliminary purification and may be mixed with inert gases. The pressure employed should be at least 20 atmospheres. The reaction begins at 100° C. and may be substantially accelerated by further raising the temperature and by the addition of catalysts. As suitable catalysts for this purpose, mention may be made of substances which present a large superficial area, such as silica gel, alumina gel, and the like, also all the heavy metals and their oxids, hydroxids, sulphids, carbonates and the like. It is advisable to ensure intimate contact of the gases with the liquid and the contact mass as for example by stirring. In this manner, the reaction may be carried to completion, with an almost quantitative yield.

The following examples will further illustrate the nature of the said invention which however is not limited thereto.

Example 1.

500 grams of nitrobenzene, 100 cc. of a 10 per cent solution of ammonium sulphid and 10 grams of iron sulphid, are heated to 150° C. while stirring, in an autoclave, under a pressure of 100 atmospheres of hydrogen. As the pressure sinks it is restored by forcing more hydrogen in at intervals. The reaction will be completed at the end of 12 hours, 370 grams of aniline, free from nitrobenzene, being obtained.

Example 2.

m-dinitrobenzene can be completely reduced to m-phenylene-diamine in 6 hours by treating it with the same weight of a solution of ammonium polysulphid containing 14 per cent of ammonia, 6 per cent of sulphid sulfur and 20 per cent of poly-sulphid sulphur and 1/10th of its weight of iron powder, in the presence of water gas at 180° C. and under a pressure of 200 atmospheres. A good yield of the product is obtained, and the latter can be separated in the form of its hydrochlorid.

*Example 3.*

300 grams of p-nitraniline are stirred with 100 cc. of 20 per cent aqua ammonia, 10 grams of sulfur and 10 grams of reduced iron, for 4 hours at 180° C. under a pressure of 120 atmospheres of hydrogen, the consumed hydrogen being replaced by degrees. In addition to 26 grams of unaltered nitraniline, 200 grams of p-phenylenediamine are recovered from the product.

In a similar way, p-nitrophenol, with ferrous oxid as catalyst, will furnish, in 6 hours, a product containing, in addition to unaltered initial products a good yield of p-amino-phenol which can be separated in the form of its hydrochlorid.

*Example 4.*

125 grams of nitrobenzene are heated to 160° C. with pure carbon monoxid in a rotary iron autoclave with a capacity of 1 litre with 200 cc. of an aqueous solution of ammonium sulphid containing 16 grams of ammonia and 14 grams of sulfur, in the presence of 5 grams of pure iron powder, and under a pressure of 140 atmospheres. If the operation be stopped at the end of 5 hours, the pressure will fall to 110 atmospheres on cooling. The residual gas is composed of 38 per cent of $CO_2$, 10.4 per cent of $H_2$, 47 per cent of CO and 4.6 per cent of $N_2$. In addition to nitrobenzene, the resulting product contains 72 per cent of aniline.

*Example 5.*

A mixture of nitrobenzene and an aqueous solution of ammonium polysulphid (containing 160 grams of ammonia, 38 grams of sulphid sulfur and 121 grams of polysulphid sulfur per litre) is passed, at from 170 to 180° C. over a ferric oxid contact mass in an atmosphere of hydrogen with a pressure of 190 atmospheres. The volumertic ratio of the sulphid solution to the nitrobenzene is 1:16. The effluent reaction product consists of two layers, having a volumetric ratio 3:1, the upper and larger of which consists of aniline containing water, but free from nitrobenzene, whilst the lower is a clear, 12.5 per cent solution of ammonium sulphate, containing a little aniline and free ammonia, but neither sulphid nor thiosulphate.

What we claim is:

1. The process of producing primary aromatic amines, which consists in reducing the corresponding nitro compounds in the presence of a gas comprising at least one of the reducing agents hydrogen and carbon monoxid, under a pressure of at least 20 atmospheres and at a temperature of at least about 100° C. with a solution containing readily soluble sulphids in an amount insufficient for the complete reduction.

2. The process of producing primary aromatic amines, which consists in reducing the corresponding nitro compounds in the presence of a gas containing at least one of the reducing agents hydrogen and carbon monoxid, under a pressure of at least 20 atmospheres and at a temperature of at least about 100° C. with a solution containing an agent selected from the group consisting of sulphids, polysulphids, mixtures of free bases with elementary sulfur and thio sulphates, the amount of the said sulfur-containing substances being substantially small and insufficient for the complete reduction.

3. The process of producing primary aromatic amines, which consists in reducing the corresponding nitro compounds in the presence of a gas containing at least one of the reducing agents hydrogen and carbon monoxid, under a pressure of at least 20 atmospheres and at a temperature of at least about 100° C. with a solution containing an agent selected from the group consisting of sulphids, polysulphids, mixtures of free bases with elementary sulfur, and thiosulfates, the amount of the said sulfur-containing substances being substantially small and insufficient for the reduction and so chosen that at the end of the reaction practically the whole of the sulfur is present in solution in the form of sulphate.

In testimony whereof we have hereunto set our hands.

PAUL HEROLD.
PAUL KOPPE.